June 4, 1957      L. S. RATLIFF      2,794,565
TRAILER FOR HEAVY MACHINERY
Filed April 14, 1955      3 Sheets-Sheet 1
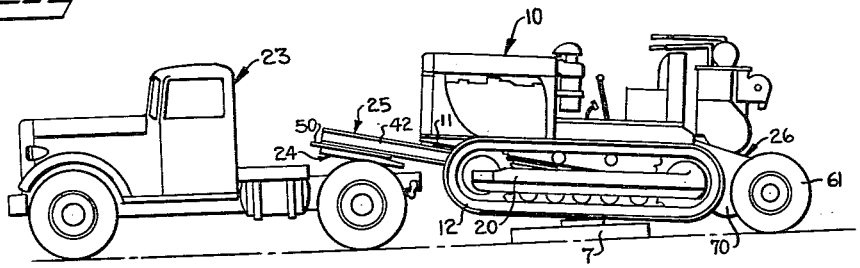
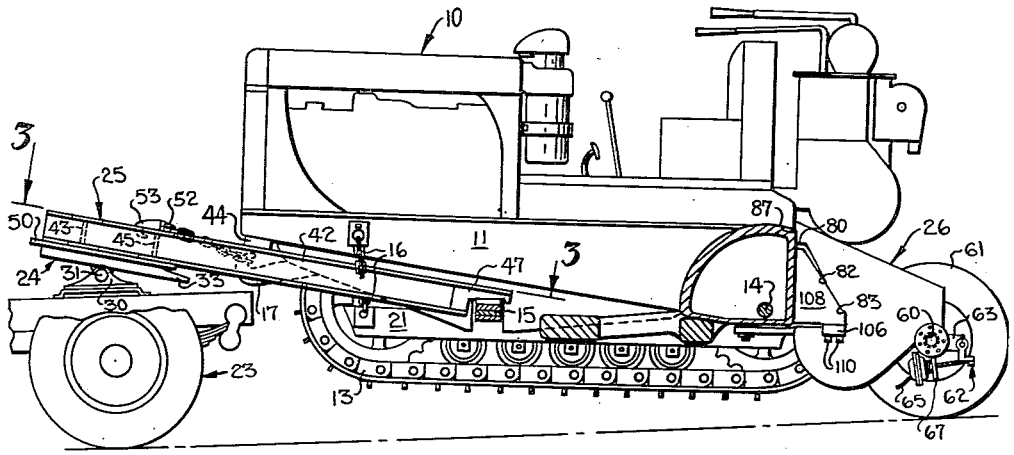
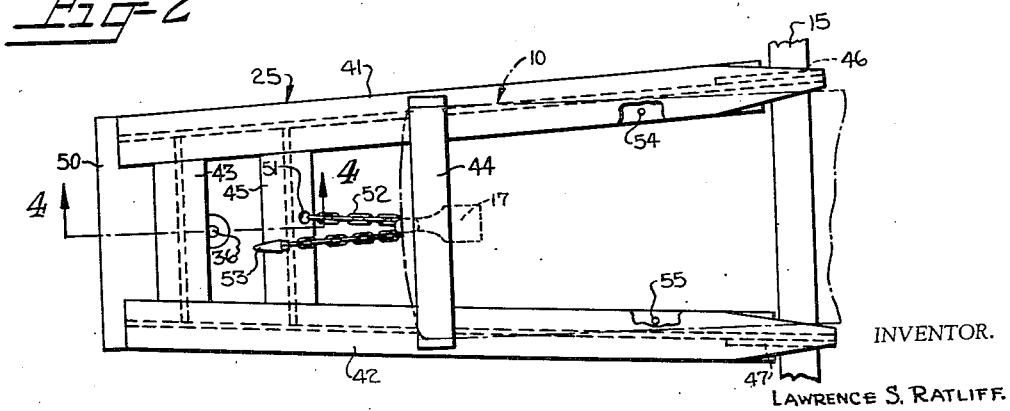
INVENTOR.
LAWRENCE S. RATLIFF.
BY *Eaton & Bell*
ATTORNEYS June 4, 1957  L. S. RATLIFF  2,794,565
TRAILER FOR HEAVY MACHINERY
Filed April 14, 1955  3 Sheets-Sheet 2
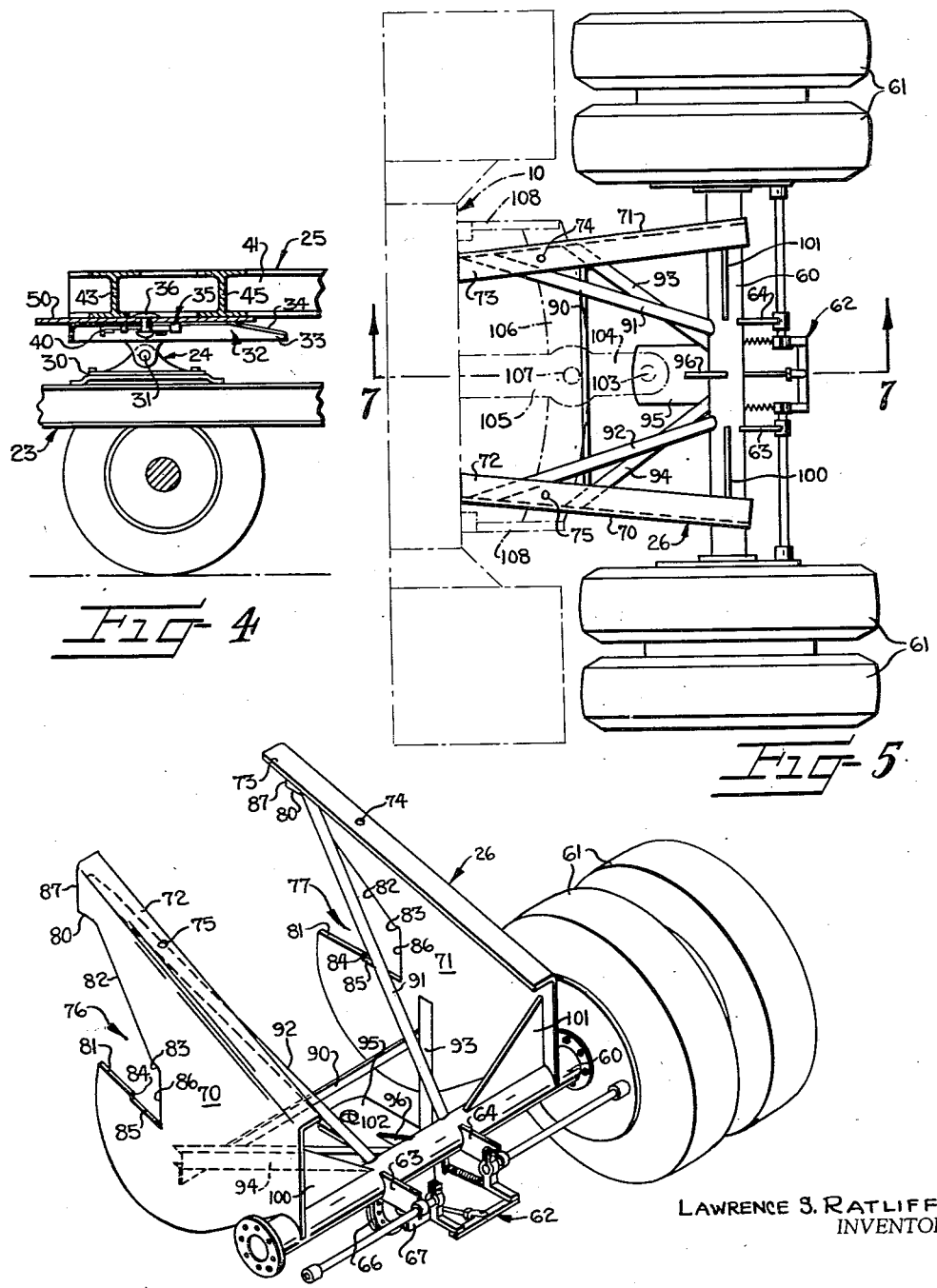
LAWRENCE S. RATLIFF,
INVENTOR
BY Eaton + Bell
ATTORNEYS

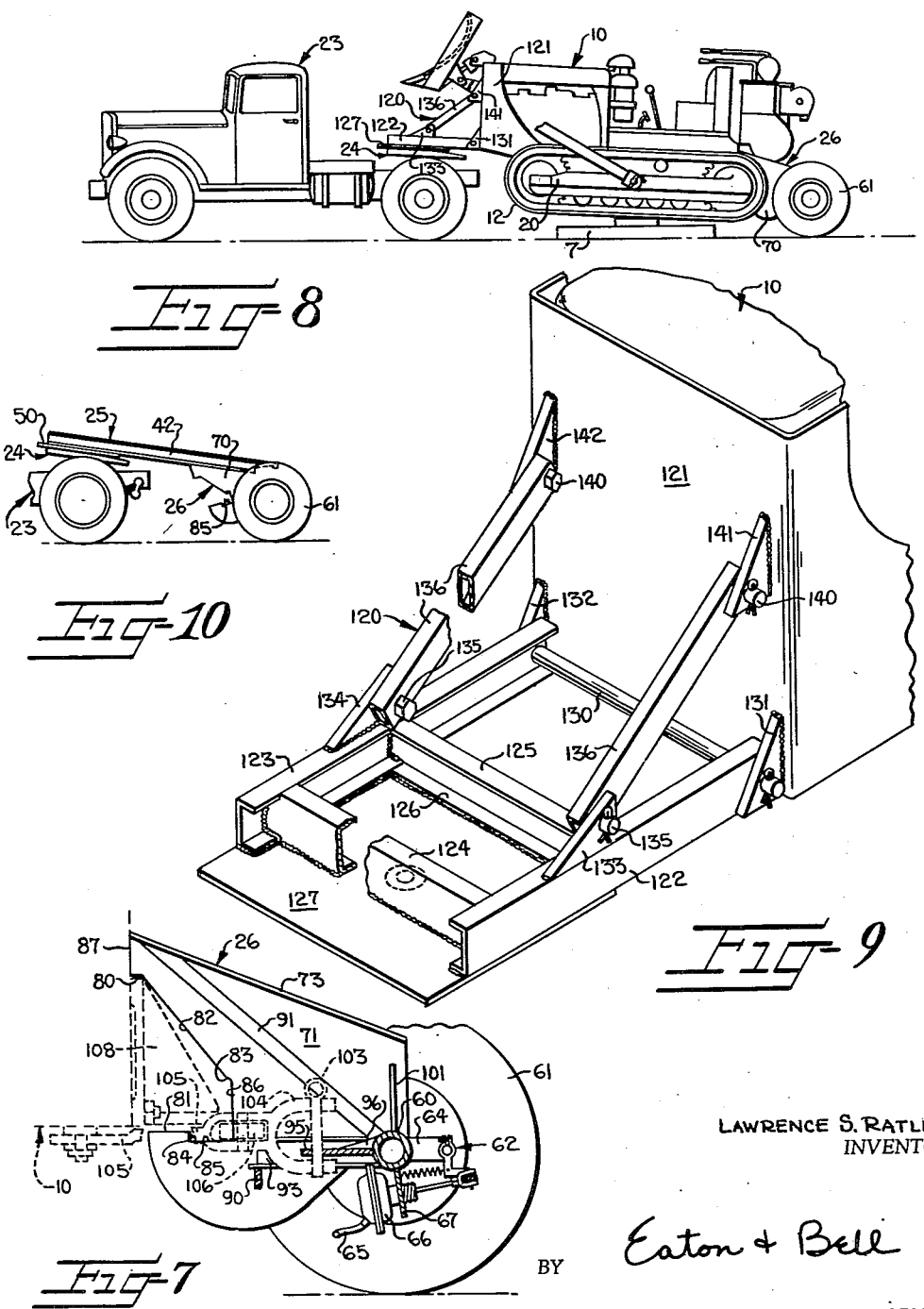

United States Patent Office 2,794,565
Patented June 4, 1957

2,794,565

TRAILER FOR HEAVY MACHINERY

Lawrence S. Ratliff, Wadesboro, N. C.

Application April 14, 1955, Serial No. 501,236

9 Claims. (Cl. 214—394)

This invention relates to carrier devices and more particularly to carrier or trailer devices for hauling earth moving equipment, bulldozers, and the like, which devices can be readily transported by a tractor.

An object of the invention is to provide a carrier device which will cradle therein the heavy machine to be carried thereby.

A further object of the invention is to provide a carrier device having a front carrier member which is to be secured to the so-called fifth wheel or coupler device of a tractor and on which will rest the front portion of a bulldozer or similar equipment, and a rear carrier member in spaced relation to the front carrier and supporting the rear portion of a bulldozer or similar equipment.

It is also a further object of this invention to completely eliminate the bed or deck portion of the body of a trailer such as heretofore has been employed for transporting heavy machinery, and to provide a carrier device comprising a front and rear portion secured to opposite ends of the earth moving machine, with the bulk of the machine suspended therebetween with the tracks of the same being held in high enough position on the carrier device to be transported from one location to another.

Some of the objects of the invention having been stated, other objects will appear as the description proceeds when taken in connection with the accompanying drawings, in which—

Figure 1 is a side elevation of one embodiment of the carrier device showing a tractor attached to the carrier and carrying a bulldozer thereon;

Figure 2 is a side elevation similar to Figure 1 on an enlarged scale with the left track of the bulldozer removed to clearly show the manner in which the front and back carrier members engage the bulldozer;

Figure 3 is a top plan view of the front carrier member on an enlarged scale taken on line 3—3 in Figure 2 with a portion of the bulldozer shown in dotted lines;

Figure 4 is a vertical section on an enlarged scale taken on line 4—4 in Figure 3 and showing the manner in which the front carrier portion is secured to the fifth wheel or coupler device of the tractor;

Figure 5 is a top plan view of the rear carrier member showing the same secured to a bulldozer shown in dotted lines;

Figure 6 is an isometric view of the rear carrier member shown in Figure 5 on a slightly enlarged scale;

Figure 7 is a vertical transverse sectional view of the rear carrier member taken on line 7—7 in Figure 5 and showing the carrier attached to the rear end of the bulldozer shown in dotted lines;

Figure 8 is a side elevation of the second embodiment of the invention showing a modified front carrier member carrying a bulldozer with an earth moving shovel attached to the front thereof;

Figure 9 is an isometric view on an enlarged scale of the second embodiment of the front carrier member shown in Figure 8;

Figure 10 is a side elevation of the preferred embodiment of the front and back carrier members shown coupled together for being moved to the site of the bulldozer or earth moving equipment to be transported.

Referring more specifically to the drawings and particularly to Figures 1 and 2, the numeral 10 indicates a piece of heavy equipment such as a bulldozer having a main lower frame 11 with spaced side tracks 12 and 13 supported therefrom by axle 14 at the back portion and having heavy leaf springs 15 at the front secured in the conventional manner to the main lower frame 11.

The frame 11 has suitably secured thereto on the inner surface of both sides a heavy chain 16 extending downwardly between side members 41, 42 of front carrier 25 and having a hook on the end thereof which engages a notch or a cut-out portion in side connecting members 20, 21 which connect a back driving wheel to a front wheel of tracks 12 and 13, respectively. The chain 16 prevents the front end of the side tracks 12 and 13 from dropping down too far and prevents the sidewise shifting of the bulldozer on the front carrier member 25. Also, the chain 16 takes most of the weight load off leaf springs 15 from which the front end of tracks 12 and 13 are suspended, when the bulldozer is elevated in position to be transported as shown in Figures 1 and 2.

To transport the bulldozer or earth moving machine 10, there is provided a tractor broadly indicated at 23 and having a fifth wheel or coupler 24 to which is attached a front support member or front carrier assembly 25 on which the front end of bulldozer 10 rests. The rear end of the bulldozer rests on a rear support member or rear carrier 26.

A coupler or fifth wheel 24 (Figures 2 and 4) of tractor 23 is of a conventional type such as disclosed in Patent No. 2,489,112 having a supporting member 30 secured to the main frame of the tractor 23, and a pivot pin 31 horizontally disposed in the upper portion of the member 30 to carry a fifth wheel plate 32. The rear portion of the fifth wheel plate 32 is bifurcated as is conventional, to define opposed portions 33 having inclined surfaces 34 to facilitate connection of the front carrier 25 thereupon. The fifth wheel 24 is provided with a suitable releasable latch means 35 between opposed portions 33, which releasable latch may be of any conventional type to engage the vertical pintle or stud 36 secured to the bottom surface of a plate 50 of the carrier 25 when the stud is moved between opposed portions 33. A pintle 36 is provided with an enlarged lower head portion for securely being engaged by the latch 35 to prevent any likelihood of disengagement. Conventional manual operable means 40 are provided to operate the latch means 35.

The stud or pintle 36 when in locked position in the fifth wheel 24 provides for pivoting of the carrier 25 on the tractor 23 about the vertical axis of the pintle 36. The front carrier 25 comprises two spaced apart side frame members 41, 42 of I-beam construction with their front ends inclined toward each other, and joined by an adjacent cross member 43 also preferably of I-beam construction. A heavy cross member or plate 44 connects the side frame members 41, 42 in spaced apart relation at an intermediate portion thereof and a cross member 45 preferably of I-beam construction connects the members 41, 42 between cross members 44 and 43.

The plate member 44 as will be noticed in Figure 3 is of sufficient length to receive thereon the front portion of a bulldozer 10 shown in dotted lines. The rear ends of the members 41, 42 have formed integral therewith or suitably secured thereto heavy hooks or anchor members 46, 47 which engage a top and side portion of the heavy leaf springs 15 on the bulldozer 10.

A flat plate 50 is suitably secured to the under side of the members 41, 42, 43 and 45 to act as a guiding surface to facilitate the inserting of the pintle or stud 36 which is suitably secured thereto into the latch means 35 of the fifth wheel or the coupler 24 of the tractor 23.

The cross member 45 is provided with an aperture 51 for receiving one end of a chain 52 suitably secured therein. The other end of the chain is provided with a hook 53 for engaging a horizontal flange portion of the I-beam-shaped cross member 45. An intermediate portion of the chain engages a hook 17 provided on the front end of the bulldozer 10 to aid in retaining the same on the carrier 25.

Apertures 54, 55 (Figure 3) are provided in the lower horizontal flange portions of the side members 41, 42 of the front carrier 25 to receive suitable studs or bolts to join thereto the back carrier 26 when it is desired to transport the carrier unloaded to the location of the earth moving equipment such as bulldozer 10 which is to be moved.

It will be observed in Figure 3 that the rear end of the frame members 41, 42 are spaced further apart than the front ends to thus cradle the front portion of bulldozer 10 therebetween with the front portion of the main lower frame 11 of the bulldozer resting on the top surface of the I-beam side members 41, 42.

The rear carrier or carriage 26 (Figures 6 and 7) is provided with a suitable axle 60 supporting rotatably mounted wheels 61 secured thereto on opposite ends by any suitable means. An air braking system broadly indicated at 62 and of the conventional type is provided on spaced parallel vertically extending flange members 63, 64 secured to the surface of the axle 60. A suitable air line 65 (Figure 7) connects an air diaphragm 66 mounted on a depending plate or flange member 67 to an air hose connection on the tractor 23 (not shown).

On the periphery of the axle 60 are provided spaced side members 70, 71 suitably secured thereto by any suitable means such as welding. The side members 70 and 71 of the carriage or carrier 26 have inwardly opposed horizontal flange portions 72, 73 provided with openings or apertures 74, 75 to correspond with openings 54 and 55 in the side frame members 41 and 42 of the front carrier 25 when the two carriers are to be connected together to be moved to the side of a bulldozer or earth moving machine which is to be transported.

The side members 70 and 71 have identical cut-out portions 76, 77 in the side surface thereof, each defined by spaced parallel horizontally extending shoulders 80, 81, an inclined edge 82 sloping downwardly from the shoulder 80 to an offset edge portion 83. A side edge 84 of the shoulder 81 connects a horizontally extending edge 85 from which a vertical edge 86 rises to join the edge portion 83.

The edges 84, 85 and 86 define a cut-out locking means for securing the rear carrier to the bulldozer 10. Vertically extending edges 87 of the side members 70 and 71, as will be observed in Figures 2 and 7, engage vertically extending flat portions on the bulldozer 10. These edges 87 cooperate with the edges 84, 85 and 86 to firmly secure the bulldozer in elevated position. As will readily be understood, by this arrangement, the greater the weight of the bulldozer, the greater the locking force holding the same in elevated position.

A rod or cross member 90 is connected to the opposing surfaces of the side members 70 and 71. Immediately above the cut-out portions 76 and 77 and below the opposing horizontally extending flange portions 72 and 73 are secured one end of bracing members 91, 92 to secure the side members 70, 71 in sloping relation to each other as will be observed in Figure 5. The other ends of the bracing members 91, 92 are secured to the axle 60. Supporting braces or channel-shaped members 93 and 94 join the inner surface of the side frame members 70 and 71 above the cross brace 90 and have their converging ends secured by any suitable means such as welding to the surface of the axle member 60 above and adjacent the sides of a connecting tongue member 95, which is also secured to the axle 60. An angle brace 96 is provided to rigidly secure the tongue member 95 to the axle 60. Triangular plate members 100 and 101 further support the side members 70 and 71 by being secured at one side edge to the inner surface of the rear portion of the side members 70 and 71 and at their bottom edges to the surface of the axle member 60.

Accordingly, it will be appreciated that the side members 70 and 71 are braced from all directions, the member 90 preventing the side members from moving inwardly toward each other or outwardly away from each other, the members 91, 92 providing an upward thrust to prevent the members 70 and 71 from breaking loose from the axle 60 upon which their rear portions are secured. The additional bracing members 93, 94, 100 and 101 serve to further increase the rigidity of the mounting of the members 70 and 71 by engaging their intermediate and end portions and securing same to the axle 60.

The tongue member 95 is provided with a central aperture 102 (Figures 6 and 7) to receive a pin 103 which is inserted therein after passing through a bifurcated portion 104 of a drawbar 105 secured to the rear end of the bulldozer 10. Conventional drawbar plate 106, secured to abutments 108, supports a drawbar 105 and a suitable locking pin 107 to penetrate both is provided to prevent side movement of the drawbar 105.

Accordingly it will be understood that the rear carrier 26 is connected to the rear end of the bulldozer 10 by the pin 103 extending through the bifurcated portion 104 of the drawbar member 105. The edge portions 84, 85 and 86 of the cut-out portions 76 and 77 of the side frame members 70 and 71 lockingly engage the sides of the drawbar plate 106 as clearly shown in Figure 2. Bolts or lugs 110 connecting abutments 108 to drawbar plate 106 depend from the drawbar plate 106 below the edge 85 of the cut-out portions 76 and 77 and thus prevent the bulldozer 10 from shifting sideways in the rear carrier 26.

The second embodiment of the front carrier is shown in Figures 8 and 9 and differs from the front carrier 25 of the other figures by providing a heavy housing or casing member 121 permanently secured to the front and side portions of the earth moving machine 10 with means thereon to receive the front carrier 120.

The front carrier 120 comprises spaced, parallel, channel-shaped side members 122 and 123 secured by cross members 124 and 125, also preferably of channel construction, with a member 126 spaced immediately below the member 125 and to which a plate member 127 is suitably secured. The plate member 127 is also suitably secured to the lower surface of portions of the side members 122 and 123 and has a pintle, not shown, similar to the member 36 in Figure 4, provided thereon for attaching the front carrier 120 to the fifth wheel or coupler device 24 of the tractor 23. A rod 130 freely penetrates apertures in the side or channel members 122 and 123 and abutment portions 131, 132 on the casing 121 and the ends of the rod 130 are provided with an opening or aperture to receive cotter keys to secure the carrier 120 to the housing or casing member 121 secured to the lower frame 11 of the earth moving machine 9. On the upper horizontal surface of the side members 122 and 123 are provided abutments or triangular portions 133 and 134 having corresponding apertures to receive securing means such as bolts 135 provided with locking keys for connecting one end of link members 136 thereto.

The other end of each of the links 136 is connected to vertically spaced triangular portions or abutments 141 and 142 secured to the casing 121 by suitable means such as bolts 140 provided with suitable locking means such as keys.

To position the bulldozer or earth moving machine 10 on the carrier device of the first embodiment, the bulldozer or earth moving machine is run up on a pile of blocks 7 until the front end of the bulldozer or earth moving machine is tilted upwardly with the back end slightly elevated. Then the tractor 23 and the front carrier 25 secured to the coupler or fifth wheel 24 thereon is backed up until the hook portions 46 and 47 of the front carrier 25 engage the leaf springs 15 of the bulldozer 10 at which time the chain 52 is secured to the hook 17 on the front portion of the bulldozer 10.

The hook 53 of the chain 52 is then secured to the cross member 45 to prevent the bulldozer 10 from moving away from the front carrier 25. The chains 16 extending from the inner side of the main lower frame 11 of the bulldozer 10 are then secured to the longitudinal members 21 to support the front end of the tracks 12 and 13 of the bulldozer 10. The chains 16 also prevent the bulldozer from shifting sideways on the carrier 25 since the chains extend down between the side members 41, 42 of the carrier 25 and are connected to the members 21 which are spaced outwardly of the members 41, 42.

Since the bulldozer 10 also has the rear end slightly elevated by the block members 7, the carrier 26 can be manually moved into engagement with the rear portion thereof. The edge portions 84, 85 and 86 of the cutouts 76 and 77 in the side members 70, 71 of the carrier 26 will be received by the sides of the drawbar plate 106 of the bulldozer 10 at which time the drawbar 105 will be secured to the tongue portion 95 of the rear carrier by the pin member 103 to prevent the rear carrier from moving out from under the bulldozer 10.

The second embodiment of the front carrier 120 shown in Figure 9 is secured to the earth moving machine 10 by alining the apertures in the members 122 and 123 with the apertures provided in the members 131, 132 and then inserting the rod member 130 to secure them together. The apertures in the rear ends of the members 136 will then be alined with the apertures in the members 141, 142 and will be secured together by the bolts 40 provided with cotter keys.

Accordingly, there has been provided a bulldozer or earth moving carrier device comprising a front portion and a rear portion which support the bulldozer or earth moving machine therebetween in elevated condition so the same may be transported to any desired location.

In the drawings and specification there have been set forth preferred embodiments of the invention and, although specific terms are employed, they are used in a generic and descriptive sense only, and not for purposes of limitations, the scope of the invention being defined in the claims.

I claim:

1. A hauling device for heavy equipment for use with a tractor having a coupler provided thereon, said hauling device comprising a front carrier and a rear carrier spaced rearwardly of the front carrier, said front carrier comprising spaced side members, a plurality of cross members connecting said side members, a plate member secured to said side and cross members, a stud portion provided on said plate for engaging said coupler, means connected to said side members for engaging front portions of said heavy equipment, said back carrier comprising an axle, wheels rotatably mounted on said axle, spaced side members secured to said axle and each having cut-out portions to lockingly engage the rear portion of the heavy equipment to carry the equipment in suspended relation between the front and rear carriers.

2. A hauling device for heavy machinery for use with a tractor having a coupler provided thereon, said device comprising a front carrier and a rear carrier spaced rearwardly of the front carrier, said front carrier comprising spaced side members, a plurality of connecting cross members, a plate member secured to the bottom surface of said side and cross members, a stud portion provided on the bottom surface of said plate for engaging said coupler, hook means extending rearwardly from the rearward edge of said side members for engaging portions of said heavy machinery, said back carrier comprising an axle, wheels rotatably mounted on said axle, and spaced side members secured to said axle with each having cut-out portions to lockingly engage the rear portion of the heavy machinery whereby the heavy machinery may be transported in elevated position and with only the heavy machinery to operatively connect the front and rear carriers together.

3. In a carrier device for hauling heavy machinery for use with a tractor having a coupler provided on the rear portion thereof, the combination of a front carrier comprising spaced side members, a plurality of cross members connecting said spaced side members, a plate connected to said spaced side members and cross members, a connecting pin provided on said plate for connecting said front carrier to said coupler on the tractor, hooks provided on the rear end of said side members and extending rearwardly to lockingly engage portions of said heavy machinery, a wheeled rear carrier spaced rearwardly of said front carrier comprising spaced side members, a plurality of bracing members provided for said spaced side members, and each of said spaced side members having cut-out portions wherein portions of the rear of the machinery are lockingly engaged to carry the equipment in suspended relation between the front and rear carriers.

4. In a hauling device for heavy machinery for use with a tractor having a coupler provided thereon, a front carrier comprising a pair of spaced side members, a plurality of cross members connecting said spaced side members, means between said side members for connecting said front carrier with the tractor coupler, and means connected to said side members for engaging front end portions of said machinery, a back carrier support spaced rearwardly of said front carrier and comprising an axle, wheels rotatably mounted on said axle, spaced side members secured to said axle, a plurality of bracing members for said side members, each of said side members being provided with cut-out portions, and edge portions of said cut-out portions defining means for lockingly engaging the rear end portion of the heavy machinery.

5. In a hauling device for machinery for use with a tractor provided with a coupler mounted on the rear portion thereof, the combination of a front carrier comprising spaced side members, a plurality of cross members connected to said spaced side members, connecting means extending below said side members for being received in said coupler on the tractor, means on said side members for engaging front portions of said machinery, link members having ends connected to the top surface of each side member, means provided on the other ends of said link members for engaging portions of said machinery, said latter means being vertically spaced from the engaging means on said side members, a rear carrier for engaging the rear portion of said machinery comprising an axle, wheels rotatably mounted on said axle, spaced side members secured to said axle, a plurality of braces supporting said side members, each of said side members provided with a cut-out portion to lockingly engage a rear portion of said machinery, and connecting means secured to said axle whereby a drawbar provided on the rear portion of said machinery may be connected thereto.

6. A carrier device for transporting an earth moving machine provided with a pair of spaced tracks, heavy leaf springs supporting said tracks at the front portion thereof, a hook portion extending forwardly from said machine, a rearwardly extending drawbar plate, and a drawbar positioned on the rear end thereof, said carrier device comprising a front carrier portion and a rear carrier portion spaced rearwardly of the front carrier portion, said front carrier portion comprising spaced side members, a plurality of cross members connecting said side members, hook portions provided on the rear extremities of said side members for lockingly engaging the leaf springs of said machine, and said back carrier portion comprising a wheeled carriage having spaced side members positioned with their upper front edges in abutting relation to the rear end of the machine and being provided with cut-out portions for engaging the rearwardly extending drawbar plate on said earth moving machine whereby the same is lockingly engaged in elevated position to be transported in suspended relation between the front and rear carrier positions.

7. In a carrier device for hauling heavy machinery for use with a tractor having a coupler provided on the rear portion thereof, the combination of a front carrier comprising spaced side members, a plurality of cross members connecting said spaced side members, a plate connected to the bottom surface of said spaced side members and cross members, a connecting pin provided on said plate for being engaged by said coupler on the tractor, means provided on the rear end of said side members to engage portions of said machinery, a wheeled rear carrier member comprising spaced side members, a plurality of bracing members provided for said spaced side members, and means on each of said spaced side members to lockingly engage the rear portion of the heavy machinery and carry same in elevated position, with only the heavy machinery serving to operatively connect the front and back carriers together.

8. In a hauling device for machinery for use with a tractor provided with a coupler mounted on the rear portion thereof, the combination of a front carrier comprising spaced side members, a plurality of cross members connected to said spaced side members, pivot means extending below said side members for being received in said coupler on the tractor, means on said side members for lockingly engaging front portions of said machinery, link members having one end connected to the top surface of each side member, means provided on the other end of said link members for lockingly engaging portions of said machinery, said latter means being spaced above the locking means on the ends of said side members, a rear carrier for engaging the rear portion of said machinery comprising an axle, wheels rotatably mounted on said axle, spaced side members secured to said axle, a plurality of braces supporting said side members, and means on each of said side members for engaging a rear portion of said machinery.

9. A hauling device for a heavy machine comprising a front carrier and a back carrier, said front carrier comprising spaced side members, means connecting said side members together, means on said side members for engaging front portions of the machine comprising a rod positioned in apertures formed in said side members and the front portion of the machine, locking means for securing said rod, a pair of spaced links secured to said spaced side members, means for securing said links to the front portion of the machine is spaced relation above said rod, said back carrier comprising an axle, wheels rotatably mounted on said axle, and spaced side members having cut-out portions for engaging rear portions of the machine.

References Cited in the file of this patent

UNITED STATES PATENTS

| | | |
|---|---|---|
| 1,657,655 | Ashton | Jan. 31, 1928 |
| 2,029,489 | Kohl | Feb. 4, 1936 |
| 2,312,769 | Mosling | Mar. 2, 1943 |
| 2,350,841 | Troche et al. | June 6, 1944 |
| 2,531,694 | Larsen | Nov. 28, 1950 |

FOREIGN PATENTS

| | | |
|---|---|---|
| 872,432 | Germany | Apr. 2, 1953 |